United States Patent [19]
Jeong et al.

[11] Patent Number: 5,491,509
[45] Date of Patent: Feb. 13, 1996

[54] FORCED INTRA-FRAME CODING METHOD

[75] Inventors: Jechang Jeong, Seoul; Wooyoun Ahn, Suwon, both of Rep. of Korea

[73] Assignee: Samsung Electronics Co., Ltd., Kyungki, Rep. of Korea

[21] Appl. No.: 268,451

[22] Filed: Jun. 30, 1994

[30] Foreign Application Priority Data

Jun. 30, 1993 [KR] Rep. of Korea ............... 93-12087

[51] Int. Cl.$^6$ ................................................. H04N 7/50
[52] U.S. Cl. ........................ 348/402; 348/408; 348/423
[58] Field of Search ............................ 348/423, 408, 348/401, 402, 412, 413, 415, 416; H04N 7/137, 7/50

[56] References Cited

U.S. PATENT DOCUMENTS 5,260,783  11/1993  Dixit ....................................... 348/423
5,365,271  11/1994  Asano .................................... 348/408

FOREIGN PATENT DOCUMENTS 536630  4/1993  European Pat. Off. ......... H04N 9/79

*Primary Examiner*—Howard W. Britton
*Attorney, Agent, or Firm*—Sughrue, Mion, Zinn, Macpeak & Seas

[57] ABSTRACT

A forced intra-frame coding method for a video processing system includes steps by which video data is coded in the vertical direction of a frame while coding is performed to permit production of forcibly intra-frame coded macro block lines maintaining a predetermined vertical interval. Whenever the coding for respective frames is finished, the forcibly intra-frame coded macro block lines are shifted downward by one macro block, which allows the original image to be restored relatively rapidly. Furthermore, the coding direction of macro blocks is established as the vertical direction. Vertical coding permits the amount of data for respective macro blocks to stay uniform and, thus, facilitates control of an associated transmission buffer in the video processing system.

10 Claims, 4 Drawing Sheets

1MB

I-th FRAME

I+1-th FRAME

I+2-th FRAME

J-th FRAME

J+1-th FRAME

J+2-th FRAME

FORCED INTRA-FRAME CODING METHOD

BACKGROUND OF THE INVENTION

1. Field of the Invention

The present invention relates to a system for coding a digital video signal, and, more particularly, to a forced intra-frame coding method for coding to rapidly and precisely reproduce forced intra-frame coded video data.

2. Discussion of Related Art

Generally speaking, apparatuses for digital processing of video and audio signals, such as a high-definition television sets, high-definition video cassette recorders, digital video cassette recorders, and digital camcorders, contain a system for coding, transmitting and storing the video and audio signals as digital data and, thereafter, decoding and reproducing the coded data. Such coding/decoding systems are increasingly covered by international standardization agreements, which agreements are being implemented at a brisk pace so that standard formats appropriate for individual application fields are available.

FIG. 1A is a block diagram of a general coding system, whose operation employs the well-known intra-frame and inter-frame coding method. A brief discussion is provided below.

For intra-frame coding, switches 22 and 23 are both turned off so that a subtractor 11 sends externally input video data to an orthogonal transformer 12. In other words, the external video data is fed to a variable-length encoder 14 via orthogonal transformer 12 and a quantizer 13. Thus, in intra-frame coding, a buffer 15 transmits the video data, which is externally input to subtractor 11 and then pulse-code modulated, to a receiver.

Meanwhile, for inter-frame coding, switches 22 and 23 both are turned on so that subtractor 11 subtracts video data supplied from a motion compensator 21 from the externally input video data. As a result, a difference signal of the input video data and video data previous to the input video data by one frame is applied to orthogonal transformer 12. An adder 18 adds the data applied via an inverse quantizer 16 and an inverse orthogonal transformer 17 and the output data of motion compensator 21, and outputs the added result to a frame memory 19. In inter-frame coding, the difference data obtained from subtractor 11 is coded, stored in buffer 15, and then output to the receiver. Such PCM or differential PCM techniques are well-known in the art.

FIG. 1B is a block diagram of a general decoding system, which decodes and reproduces the video data coded by the exemplary coding system of FIG. 1A. The general decoding system is composed of a variable-length decoder 31, an inverse quantizer 32, an inverse orthogonal transformer 33, an adder 34, a motion compensator 35, and a frame memory 36 so as to decode the video data coded by the FIG. 1A apparatus. In the case of intra-frame coded data, the output data of inverse orthogonal transformer 33 passes through adder 34 as a switch 37 is turned off. In the case of inter-frame coded data, adder 34 adds the output data of inverse orthogonal transformer 33 and data applied from motion compensator 25 provided via turned-on switch 37. The decoding system of FIG. 1B is commonly used. Thus, further detailed discussions of the operation will not be provided.

FIG. 2A illustrates one frame of video data coded by FIG. 1A apparatus. As shown in FIG. 2A, one frame, made up of X(column)×Y(row) pixels, is divided into P(column)× Q(row) macro blocks (hereinafter referred to as MB) which are predetermined units for use in coding. The MB consists of m(row)-by-n(column) blocks, each having N-by-N pixels. Each of the MBs has luminance data blocks Y and color data blocks C. If one MB is made up of four luminance data blocks Y and two color data blocks C, N×N pixel blocks of the MB are coded in the order of the arrow shown in FIG. 2B.

In such coding systems, when power is turned on, a channel is changed, or an error is produced in the middle of coding, the original image cannot be restored in an inter-frame coding, i.e., wherein a frame is reconstructed by adding a decoded difference signal and a previous frame signal. In order to enable the decoder to normally restore an image, the coder performs intra-frame coding with respect to part of the data of the overall frames. Units for intra-frame coding are the macro blocks. MBs which are forcibly intra-frame coded by a predetermined period are called 'forced intra MBs'.

FIGS. 3A, 3B and 3C illustrate forcibly intra-frame coded frames of video data. Forcibly intra-frame coded MBs are represented by the hatched columns in FIGS. 3A, 3B and 3C. First, in FIG. 3A, the (i)-th frame of video data is coded sequentially from left to right. For coding of respective frames, macro blocks of the uppermost part of a frame are coded from left to right. As shown in FIGS. 3A, 3B and 3C, forced intra-frame coding is performed for every predetermined period of MB. The remaining macro blocks are inter-frame coded. When one row of coding is finished, a next row of coding is carried out in the same way. Likewise, respective macro blocks are coded.

When the (i)-th frame of coding is finished, forcibly intra-frame coded MB columns of the (i+1)-th frame, i.e., the next frame, are shifted by one column to the right, as shown in FIG. 3B. Likewise, when the (i+1)-th frame of coding is finished, the forcibly intra-frame coded MB columns of the (i+2)-th frame, i.e., the next frame, are shifted by one column, as shown in FIG. 3C.

The data coded in the above-described way is restored by the FIG. 1B apparatus. The inter-frame coded macro blocks are restored on the basis of a normally renewed previous frame of video data. If the previous frame of video data is not in a state of renewal, the inter-frame coded macro blocks are not normally restored. Therefore, if there is horizontal movement in the blocks, a time delay is required for normal restoration of the inter-frame coded macro blocks since the previous frame of video data cannot be normally renewed. That is, time delay is required until the previous frame of video data, for use in the restoration of the inter-frame coded macro blocks, is completely renewed. Since there is more horizontal movement than vertical movement in most images, the time delay becomes more serious.

A technique for enabling high-speed playback of encoded video information is disclosed in EP No. 0,536,630 A2, which was laid open on Apr. 14, 1993, to Niimura. According to this reference, one refresh block is transmitted for each horizontally disposed 11 super blocks in a data transmission sequence different from a sequence of reading pixels arranged in accordance with scanning lines. Then, in a high-speed playback mode, the refresh block data is serially written in a frame memory, and the data stored in the frame memory is read out in the transmission sequence of the pixels in accordance with the scanning lines. This allows a good-quality image to be easily obtained during high-speed playback.

SUMMARY OF THE INVENTION

The present invention proposes a method for facilitating the playback of coded information at a high speed in a way different from that of the above-described reference.

It is an object of the present invention to provide a forced intra-frame coding method for rapidly and precisely restoring video data by improving a method of performing the forced intra-frame coding in a video data coding system.

These and other objects, features and advantages according to the present invention are provided by a method of selectively intra/inter-frame coding video data divided into a predetermined size of blocks by a forced intra-frame coding. The method comprises the steps of: (a) receiving blocks of a video frame in a vertical direction of the video frame; (b) selectively intra/inter coding the received video data blocks and forcibly intra-frame coding horizontally nearby block lines; and (c) shifting the forcibly intra-frame coded block lines whenever one frame of video data is finished coding.

DETAILED DESCRIPTION OF THE PREFERRED EMBODIMENT

Hereinafter, a preferred embodiment of the present invention will be described with reference to the attached drawings.

Figure 4A:
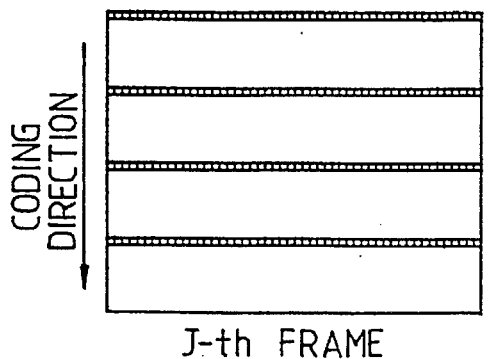
FIG. 4A, FIG. 4B and FIG. 4C are conceptional diagrams which are useful in explaining forced intra-frame coding according to the present invention.
Figure 4B:
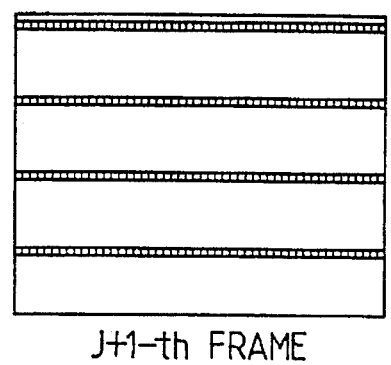
Figure 4C:
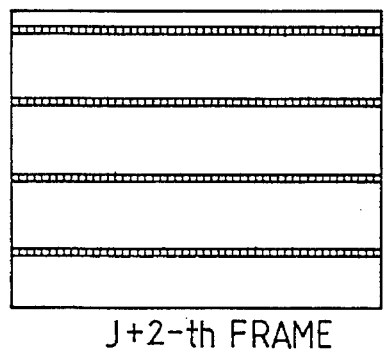
Figure 5:
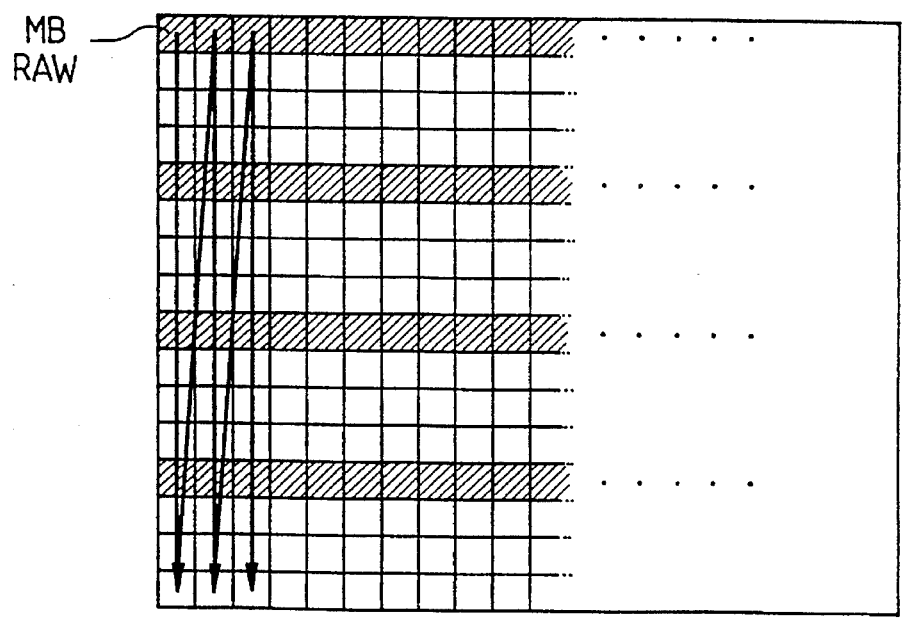
FIG. 5 illustrates a coding sequence of each video frame.

FIGS. 4A, 4B and 4C illustrate frames coded according to the forced intra-frame coding of the present invention. Referring to FIG. 4A, first, in the (j)-th frame the forcibly intra-frame coded MB lines are set to be horizontal and have a predetermined interval vertically. Video data is coded in the vertical direction of the frames, say, from the top to the bottom thereof, as shown in FIG. 5. If the (j)-th frame of coding is finished in this way, the forcibly intra-frame coded MB lines of the (j+1)th frame, i.e., the next frame, are shifted downward by one line, as shown in FIG. 4B. Likewise, if the (j+1)-th frame of coding is finished, the forcibly intra-frame coded MB lines of the (j+2)-th frame, i.e., the next frame, are shifted downward by one line, as shown in FIG. 4C.

FIG. 5 is an enlarged diagram of the forcibly intra-frame coded (j)-th frame of FIG. 4A. If the coding direction is horizontal as in the conventional technique, the amount of forcibly intra-frame coded data increases so much that it can severely vary the amount of coded information. Therefore, the coding direction according to this invention is such that when the coding related to one of the macro block lines is finished, then the coding related to the right macro block lines of the above coded macro block lines are performed. The coding is carried out from the topmost macro block to the bottommost macro block. Since the encoding direction of the present invention is vertical, in the case of the forced intra-frame encoding of FIGS. 4A, 4B and 4C, the amount of coded information is lowered. In other words, since the amount of data for respective encoded macro blocks stays roughly uniform, the coding apparatus of the present invention facilitates the control of buffer 15 shown in FIG. 1.

In order to realize the features of the present invention with an apparatus, it is required to change the input sequence of video data input to the conventional coding system to the input sequence of the present invention. The conventional coding system horizontally reads out the macro blocks of a video frame, whereas an apparatus for the present invention vertically reads out the macro blocks of the video frame, as shown in FIG. 5.

Figure 1A:
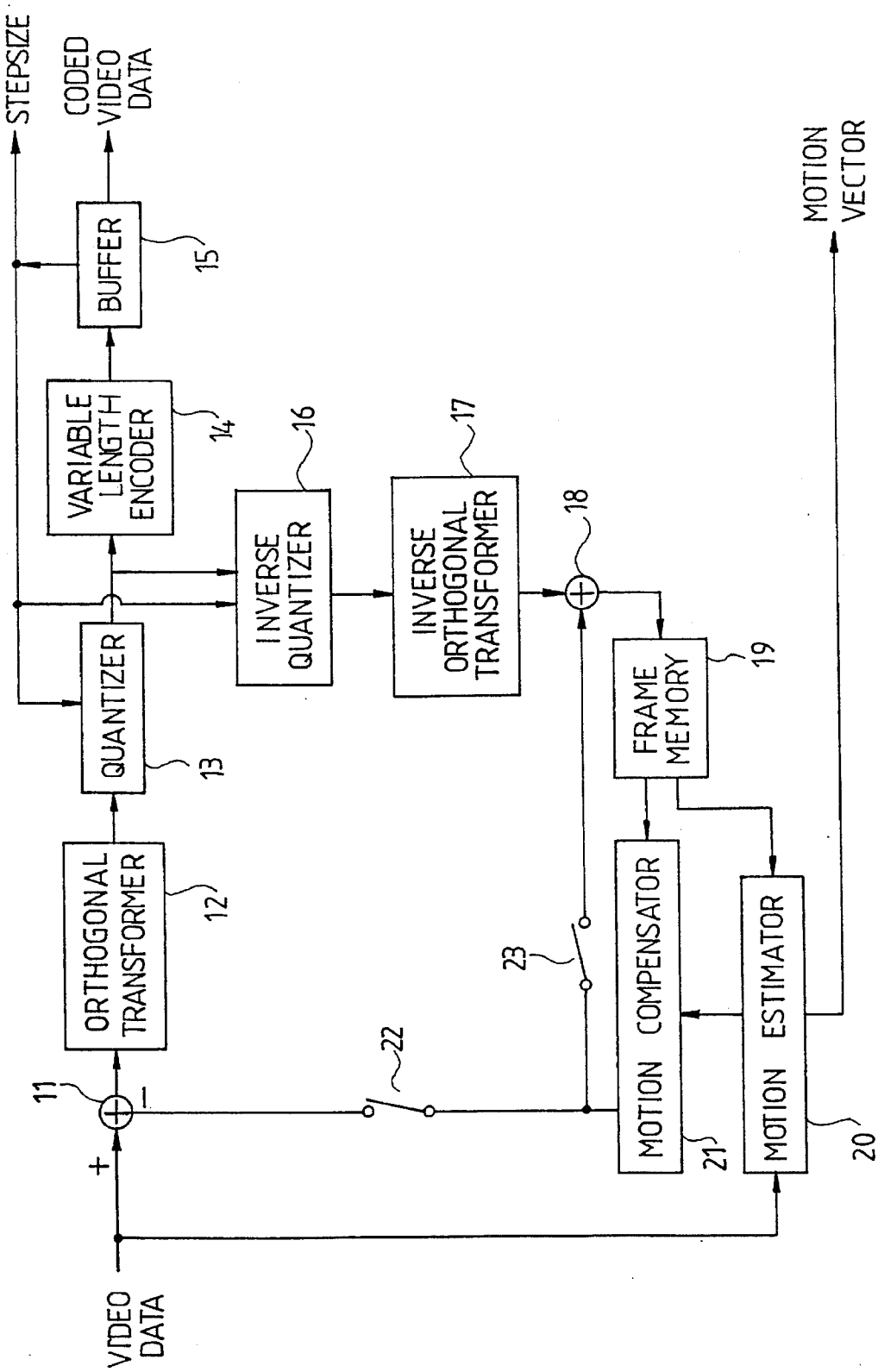
FIG. 1A and FIG. 1B are block diagrams of conventional coding and decoding systems, respectively.
Figure 1B:
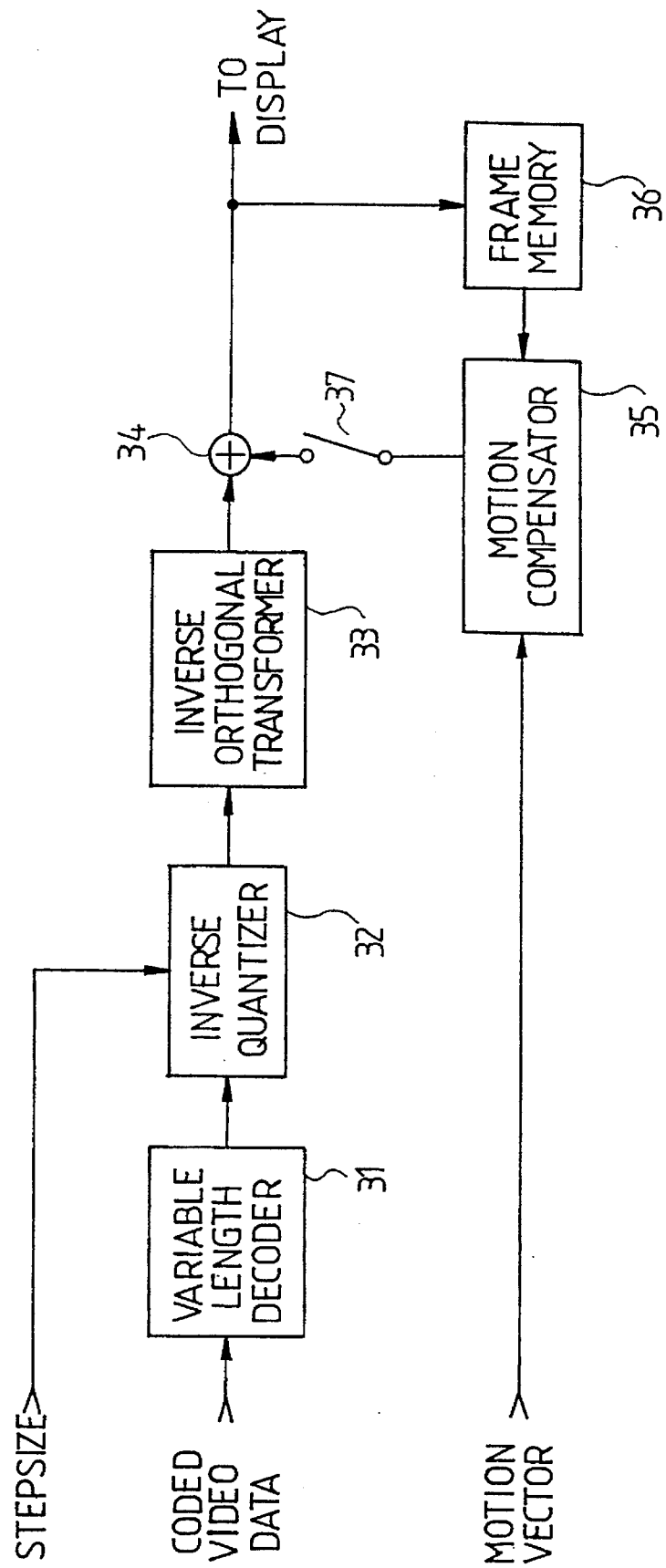
Figure 2A:
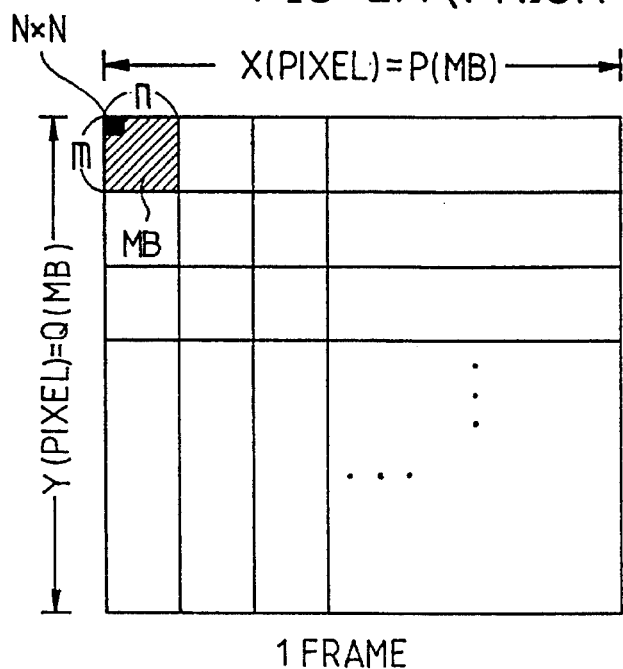
FIG. 2A and FIG. 2B are conceptional diagrams of the format of coded video data.
Figure 2B:
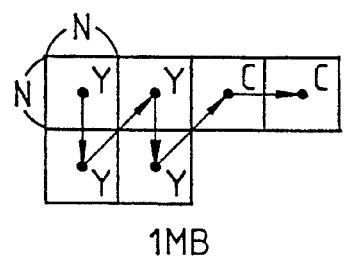
Figure 3A:
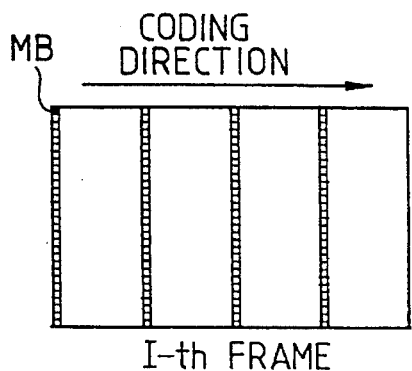
FIG. 3A, FIG. 3B and FIG. 3C are conceptional diagrams which are useful in explaining conventional forced intra-frame coding.
Figure 3B:
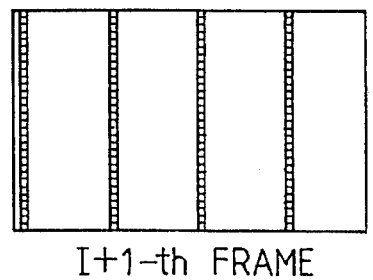
Figure 3C:
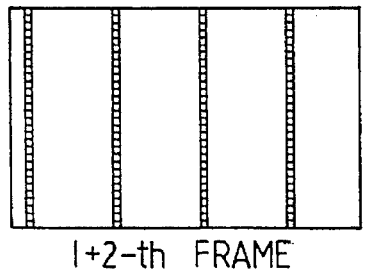

It will be appreciated by one of ordinary skill in the art that video data can be coded and decoded by employing the features of the present invention in the apparatuses illustrated in FIGS. 1A and 1B. It will also be noted that the features of the present invention can be modified in various ways without departing from the spirit and scope of the invention.

As described above, in the forced intra-frame coding method according to the present invention, the forcibly intra-frame coded macro block lines are set to have a predetermined vertical interval so as to restore the original image relatively rapidly, as compared with the conventional method in which the macro block lines are formed and forcibly intra-frame coded vertically. Furthermore, the encoding direction of macro blocks is set to be vertical so that the amount of data for respective macro blocks stays uniform, permitting the transmission buffer to be easily controlled.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

We claim:

1. In a method of selectively intra/inter-frame coding video data divided into a plurality of blocks of a predetermined size, a forced intra-frame coding method comprising the steps of:

(a) receiving blocks of a video frame in a vertical direction with respect to said video frame to produce respective received video data blocks;

(b) selectively intra-frame and inter-frame coding said received video data blocks and forcibly intra-frame coding a plurality of horizontally adjacent blocks to produce a forcibly intra-frame coded block line; and (c) shifting respective positions of said forcibly intra-frame coded block line whenever one frame of video data is finished coding.

2. The forced intra-frame coding method as claimed in claim 1, wherein, when one vertical macro block line forming said video frame is completely input, said step (a) begins receiving a next vertical macro block line located to the right of the completely input vertical macro block line.

3. A forced intra-frame coding method as claimed in claim 1, wherein said step (b) performs coding so that a plurality of forcibly intra-frame coded block lines are included in each of said frames.

4. The forced intra-frame coding method as claimed in claim 3, wherein during said step (c), said forcibly intra-frame coded block lines are included in said each of said frames.

5. The forced intra-frame coding method as claimed in claim 4, wherein each of said forcibly intra-frame coded block lines are made up of a plurality of macro blocks forming one line of said video frame.

6. In a method of selectively intra/inter-frame coding video data divided into a plurality of blocks of a predetermined size, a forced intra-frame coding method comprising the steps of:

(a) receiving a plurality of blocks corresponding to a video frame in a vertical direction with respect to said video frame to produce received video data blocks;

(b) selectively intra-frame and inter-frame coding said received video data blocks while forcibly intra-frame coding horizontally adjacent blocks defining a forcibly intra-frame coded block line; and (c) shifting a respective position of said forcibly intra-frame coded block line corresponding to a next video frame whenever a present said video frame has been completely coded.

7. The forced intra-frame coding method as claimed in claim 6, wherein, when one vertical macro block line forming said video frame is completely input, said step (a) begins receiving another vertical macro block line located to the right of the completely input vertical macro block line.

8. The forced intra-frame coding method as claimed in claim 6, wherein said forcibly intra-frame coded block line comprises a plurality of macro blocks defining one horizontal section of said video frame.

9. The forced intra-frame coding method as claimed in claim 6, wherein said step (b) comprises selectively intra-frame and inter-frame coding said received video data blocks while forcibly intra-frame coding horizontally adjacent blocks defining a plurality of forcibly intra-frame coded block lines.

10. The forced intra-frame coding method as claimed in claim 9, wherein in said step (c) comprises shifting respective positions of said forcibly intra-frame coded block lines corresponding to a next video frame whenever a present said video frame has been completely coded.

* * * * *